Sept. 7, 1943.  W. H. BRADY  2,329,151

DYNAMO-ELECTRIC MACHINE CONSTRUCTION

Filed Feb. 26, 1942

Inventor
William H. Brady

Witness:
Godfrey Pecina

By John F. Heine
Attorney

Patented Sept. 7, 1943

2,329,151

UNITED STATES PATENT OFFICE 2,329,151

DYNAMOELECTRIC MACHINE CONSTRUCTION

William H. Brady, Roselle, N. J., assignor to The Singer Manufacturing Company, Elizabeth, N. J., a corporation of New Jersey Application February 26, 1942, Serial No. 432,384

3 Claims. (Cl. 171—252)

This invention relates to an improved construction for dynamoelectric machines or other structures requiring a high degree of concentricity with minimum clearance between rotating and stationary members.

The construction according to my invention is particularly useful in dynamoelectric units which are employed as transmitters and/or receivers in so-called synchro-tie or self-synchronous systems to operate mechanisms or to transmit indications from remote points, such for example, as are used in the transmission of gun-fire control data and marine and aircraft navigational data. In such systems it is important that the receiver unit follow the transmitter unit with great accuracy. That is to say, it is desirable that the units continuously maintain precise angular coincidence between the transmitter and receiver. In connection with such units, it has been found that one of the factors essential to the accuracy of transmission is the concentricity of the rotor within the rotor-receiving bore in the stator. The more nearly concentric the rotor is positioned within the rotor-receiving bore, the smaller will be the departure from the ideal precise coincidence of angular position between the transmitter and receiver units.

In the prior art construction of dynamoelectric machines involving the customary stator frame and end-bonnets, the three pieces are machined separately and then assembled to form the complete casing. First, shoulder portions are turned on the ends of the stator frame, generally in two operations. Then the rotor-receiving bore is ground using the shoulders in the stator frame as reference. The end-bonnets usually have the complementary shoulders turned and the bearing bores ground in the same operation. It is clear that by these multiple operations in which a new reference is successively used for positioning the piece for the next operation, errors in concentricity may be multiplied. Another source of constructional error in this prior art procedure is the lack of parallelism of the vertical planes containing the transverse surfaces of the shoulder portions of the stator frame. This out-of-parallel condition results in a non-coaxial bore alignment with an attendent tightness of bearings and an adverse effect on the concentricity between rotor and stator.

The present improved construction contemplates a rotor-receiving bore and a bearing bore in the end-bonnets having preferably the same finished diameter so that, after assembly of the stator frame and end-bonnets, all three bores may be finished with the same tool and in the same single operation thus insuring the absolute concentricity and coaxial alignment of said bores.

It is, therefore, an object of this invention to provide a simplified and more economical method of construction and assembly for dynamoelectric machines involving bearing supports, the finished bore diameters of which are made preferably the same as that of the rotor-receiving bore in the stator core to facilitate the holding of a coaxial concentric relation between said bores by permitting said bores to be finished, after assembly of the end-bonnets to the stator-frame, by the same machining tool and in the same single operation, in the same manner as though a single bore in a single piece were involved.

In connection with the accuracy of data transmission by dynamoelectric devices employed as transmitters and/or receivers it is important that such units be adapted for ready inspection and servicing of the rotor member, particularly in order to detect and remedy any corrosion or mechanical wear of the slip rings causing poor electrical contact which might produce an erratic or false indication. This periodic checking is especially important in the case of devices used for transmission of aircraft navigational data where a false indication might well endanger both life and property.

With conventional construction, such removal of the rotor entails the disassembly of at least one end-bonnet from the stator ring and in reassembly the bearing alignment requires a careful recheck for concentricity which consumes much time and may introduce considerable error. This rechecking is especially difficult in those cases where the air gap is small and in many units the gap may be as small as five thousandths of one inch.

It is, therefore, a further object of this invention to provide an improved construction for dynamoelectric machines which involves means for removing and/or inserting the complete rotor assembly through the bearing bore at either end of the machine without the necessity of removing the end-bonnets and thereby disturbing the initially correct coaxial alignment of the bearings and the concentricity between rotor and stator at the air gap.

With the above and other objects in view, as will hereinafter appear, the invention comprises the devices, combinations and arrangements of parts hereinafter set forth and illustrated in the accompanying drawing of certain specific embodiments of the invention, from which the several features of the invention and the advantages attained thereby will be readily understood by those skilled in the art.

Figure 1:
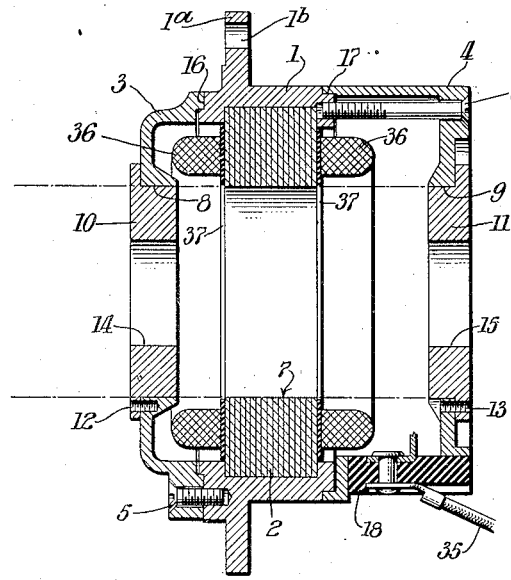
Fig. 1 is a longitudinal sectional view of one form of stator assembly of a dynamoelectric machine embodying the invention.
Figure 3:
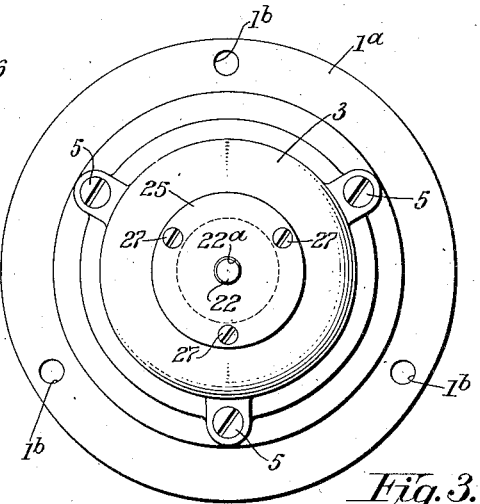
Fig. 3 is a left end elevational view of the dynamoelectric machine shown in Fig. 2.

Referring more specifically to Fig. 1, there is shown a three-part stator housing for a dynamoelectric machine comprising a centrally-disposed annular frame member 1, formed with a flanged portion 1a having mounting holes 1b, a laminated stator core member 2 secured within said frame member, and end-bonnets 3 and 4 positioned endwise adjacent to and supported by said frame member 1, being secured thereto by means of screws 5 and 6, respectively, threaded into said frame member. The laminated stator core member 2 is provided with a central rotor-receiving bore 7 and the end-bonnets 3 and 4 are provided with bearing-supporting bores 8 and 9, respectively, which are preferably of the same finished diameter as and are coaxial with the rotor-receiving bore 7 as clearly indicated by the dot-dash projection lines in Fig. 1.

Preferably, but not necessarily, the frame member 1 is formed as a die casting, the laminated stator core member 2 being secured integrally within the die-cast frame and forming therewith a unitary stator frame assembly. The end-bonnets 3 and 4 preferably may be die-cast and, as shown in Fig. 1, may be provided with bushings 10 and 11 which fit within said bores 8 and 9, respectively, and may be removably secured therein preferably by screws threaded into the end-bonnets and occupying the threaded portions 12 and 13. The bushings 10 and 11 provide bearing-receiving bores 14 and 15 adapted to receive bearings in which the rotor is journaled. It is to be understood that the elements forming the outer race rings of such bearings may be made of such diameter as to be received directly in the bores 8 and 9. The bushings 10 and 11 are primarily employed to adapt the usual commercially available bearings to a larger diameter to avoid the cost of special bearings. The specific construction of Fig. 1 is utilized in those cases in which the diameter of the stator bore is greater than the diameter of the bearing-receiving bores.

In building a dynamoelectric structure of this kind the unitary stator frame and core comprising the frame member 1 and the core member 2 may be provided with the usual current-carrying winding 36 and end insulating pieces 37, and may be assembled together with the end-bonnets 3 and 4, employing, as securing means, the screws 5 and 6, respectively, and having, for example, the usual interfitted complemental peripheral shoulder portions engaged along the surfaces shown as lines 16 and 17 in the sectional view of Fig. 1.

It is to be understood that the fit between the stator frame and the end-bonnets is no longer critical or even important since it is essentially the final single-bore finishing operation that determines the bearing alignment relative to the stator bore. For this reason the turned shoulders may, in fact, be entirely dispensed with and the end-bonnets or their equivalents may be secured, by welding, riveting or any other suitable means of fastening, directly to the roughly-faced ends of the stator frame. The advantage of this construction in the production of low cost motors of small diameter is at once evident. The assembled unit above described comprising a stator frame and end-bonnets is set up and the bores 8 and 9 in the end-bonnet and the bore 7 in the stator core are finished by machining in the same manner as would be employed in the case of a single continuous bore of uniform diameter.

Figures 4, 5:
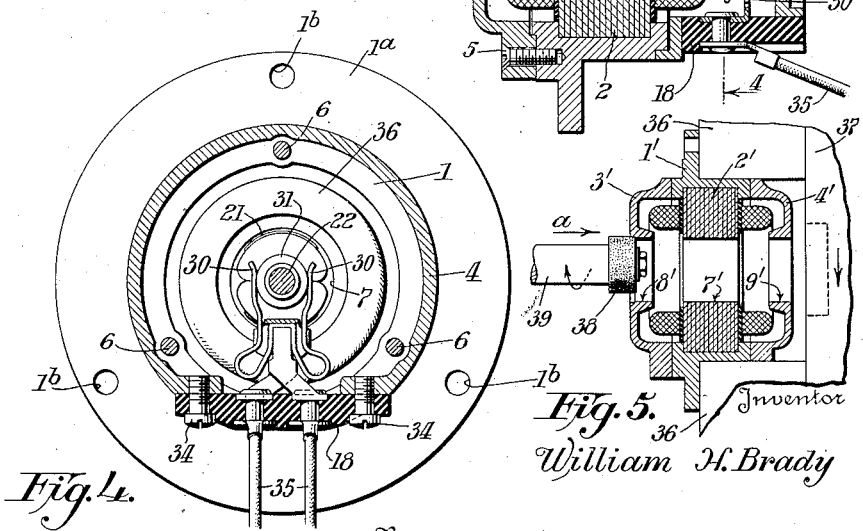
Fig. 4 is a sectional view taken on the line 4—4, Fig. 2.
Fig. 5 is a view illustrating my improved method of finishing the rotor-receiving bore in the stator core and the bearing-supporting bores in the end bonnet in the same single continuous operation with the same tool.

A preferred form of set-up for performing this finishing operation is shown in Fig. 5 wherein the stator frame 1', wound core 2', and end bonnets 3', 4', assembled as a unitary structure, are held within the movable jaws 36 of a driving workholder 37 and rotated slowly. At the same time, a grinding wheel 38 supported on spindle 39 and rotating against the direction of rotation of the unitary structure is given an axial feed as indicated by the arrow a, and traverses the apertures 8', 7' and 9', successively, in a single continuous operation, removing material from their internal faces until a proper uniform finished diameter is reached.

It is also contemplated that the so-called "plunge-cut" method of grinding may be employed in which case a grinding wheel with a face sufficiently wide to span the three apertures is reciprocated axially and fed radially to remove surface material to a finished internal diameter.

Similarly, a diamond boring tool or reamer may be used in this set-up in substitution for the grinding wheel. Any one of the above mentioned operations satisfies the essential requirement that all three apertures are finished with the same single tool in the same single continuous operation. This process insures absolute concentricity and coaxial alignment between those bores which are essential to the proper positioning of the rotor relative to the rotor-receiving bore.

In the arrangement of Fig. 1 where the bearing-supporting bore diameter is larger than the outside diameter of the bearings accommodated in the end-bonnets, it becomes necessary to employ bushings 10 and 11 to adapt said bearings to the larger diameter. With this construction, the only possible eccentricity between the stator bore 7 and the bearing-receiving bores 14 and 15 would be that contributed by the bushings 10 and 11, themselves, due to eccentricity of the central bores 14 and 15 relative to the outer peripheries which fit within the bearing-supporting bores 8 and 9, respectively. This will ordinarily be negligible due to the fact that the simple shape of the bushings makes it an easy matter to hold the desired concentricity in these pieces.

Figure 2:
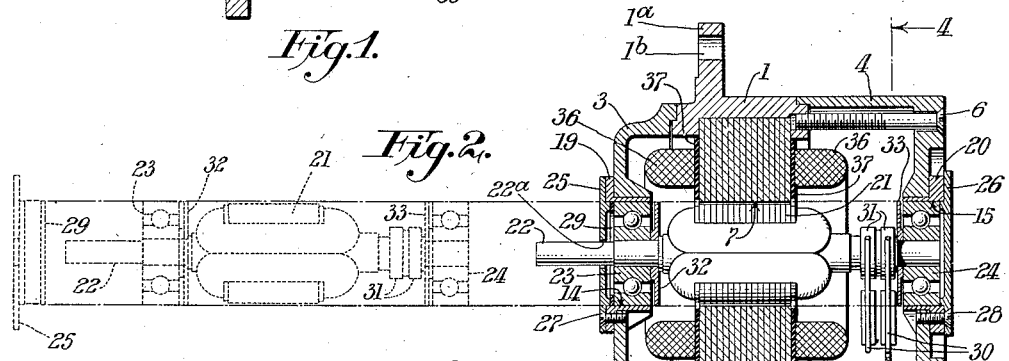
Fig. 2 is a longitudinal sectional view taken through the axis of another form of completely assembled dynamoelectric machine showing in dotted lines the rotor and associated parts in removed position.

In Fig. 2 is illustrated a preferred arrangement in which the rotor-receiving bore diameter is the same as the bearing-receiving bore diameter. This diameter relation is especially applicable to dynamoelectric machines of small rotor diameter such, for example, as the small self-synchronous units for transmitting indications, one of which units is shown in Fig. 2.

The construction of Fig. 2 is substantially the same as that of Fig. 1 except that the bushings 19 and 20 which provide the bearing-receiving bores 14 and 15 are preferably permanently inserted within the respective end-bonnets 3 and 4 during the casting thereof.

Referring again to Fig. 2, the usual wound rotor core 21 is shown fixed on a stepped rotor shaft 22 which is journaled in bearings 23 and 24, secured by a close slip fit within the inserted bushings 19 and 20 respectively. The bearings 23 and 24 are held in place within the end-bonnets and are protected from the penetration of external foreign matter by end caps 25 and 26 which extend slightly within the bores 14 and 15 in said bushings and radially overlie the end portions thereof to which they are removably secured preferably by means of screws 27 and 28 to form retainers for the bearings 23 and 24. The retainer cap 25 is provided with an aperture 22ª through which the shaft 22 extends. A spring washer 29 is positioned axially between the outer race-ring of the bearing 23 and the retainer cap 25 and maintains a slight positive axial thrust on the bearings at all times to reduce end play and noise and, at the same time, allows limited axial thermal expansion of the shaft without binding at the bearings.

The inner race-rings of bearings 23 and 24 with associated oil-shield discs 32 and 33, respectively, are pressed onto end journal portions of the rotor shaft 22 so that they are positioned against shoulders provided by steps on the rotor shaft 22, as shown in Fig. 2.

Brushes 30, shown and described in the co-pending application Serial No. 436,992, filed March 31, 1942, are supported on a terminal block 18 of insulation material and make contact with slip rings 31 to conduct current from the exterior leads 35 to the rotor winding. The terminal block 18 is removably secured to the end-bonnet 4 by means of screws 34 threaded into said end-bonnet as shown in Fig. 4.

With this construction, the rotor may be readily removed from the stator bore by a very simple manipulation. First, the terminal block carrying the brushes 30 is removed by merely withdrawing the screws 34 and pulling the block and brush assembly away from the end-bonnet 4. Then the end caps 25 and 26 are removed from the respective end-bonnets by withdrawing screws 27 and 28. Next the rotor 21, and its associated bearings 23, 24 may be removed as a unitary assembly by pressing axially against the bearing at either end and pushing the assembly completely through the stator and bearing bores. This assembly is shown in its removed position by the dotted lines of Fig. 2, the path of removal being indicated by the dot-dash lines therein. It is clear that the diameter of the rotor core 21 is less than the diameters of the bearing-receiving bores 14 and 15 by an amount substantially equal to the necessary air gap clearance, which relation allows the rotor to be withdrawn through either bearing bore easily and without damage to the bore surface. Reassembly, of course, is readily effected by following the above procedure in reverse order. Of primary importance in this operation is the fact that the end-bonnets are not removed from engagement with the frame member at any time. In this way the concentricity and coaxial alignment of the rotor-receiving and bearing-supporting bores established by the initial assembly is not disturbed by the disassemblies required by the frequent rotor inspections.

From the foregoing it will be perceived that I have provided an improved construction for dynamoelectric machines which involves the equality of diameters of rotor-receiving and bearing-supporting bores which allows said bores to be finished with a single tool in a single operation thus affording greater accuracy in providing and maintaining concentricity between said bores, and permitting removal of the rotor to be made readily and without misalignment of the bearing-supporting bores with respect to each other and/or the rotor-receiving bore.

It will be obvious to those skilled in the art that the invention may, without departure from its essential attributes, be embodied in various specific forms other than those shown and described, which latter are to be considered in all respects as illustrative of the invention and not restrictive; reference being had to the appended claims rather than to the foregoing description to indicate the scope of the invention.

Having thus set forth the nature of the invention what I claim herein is:

1. A stator casing for a dynamoelectric machine comprising a frame member, a laminated magnetic core carried by said frame member and having a rotor-receiving bore, said frame member including bearing-supporting members at opposite ends thereof, said bearing-supporting members being each formed with a bearing-supporting bore, all of said bores being finished to the same internal diameter.

2. In a dynamoelectric machine, a frame member, a laminated magnetic core carried by said frame member and formed with a rotor-receiving bore, bearing supports positioned adjacent opposite ends of and secured to said frame member and each formed with a bearing-supporting bore coaxial with and of the same finished diameter as said rotor-receiving bore, a bushing removably positioned within each of said bearing-supporting bores and formed with a concentric bore adapted to receive an anti-friction bearing therein.

3. In a dynamoelectric machine, a frame member, a laminated magnetic core permanently secured to said frame member and formed with a rotor-receiving bore, bearing supports positioned adjacent opposite ends of and secured to said frame member and each formed with a bearing-supporting bore coaxial with and of the same finished diameter as said rotor-receiving bore, a bushing removably positioned within each of said bearing-supporting bores and formed with a concentric bore adapted to receive an anti-friction bearing therein, and end cap members removably secured to the bearing supports and positioned to retain said bearings against axial movement within the bores in said bushings.

WILLIAM H. BRADY.